Dec. 30, 1958    W. DE BACK    2,866,486
PEELING MACHINE HAVING PEAR INDEXING MEANS
Filed Oct. 13, 1954    5 Sheets-Sheet 1
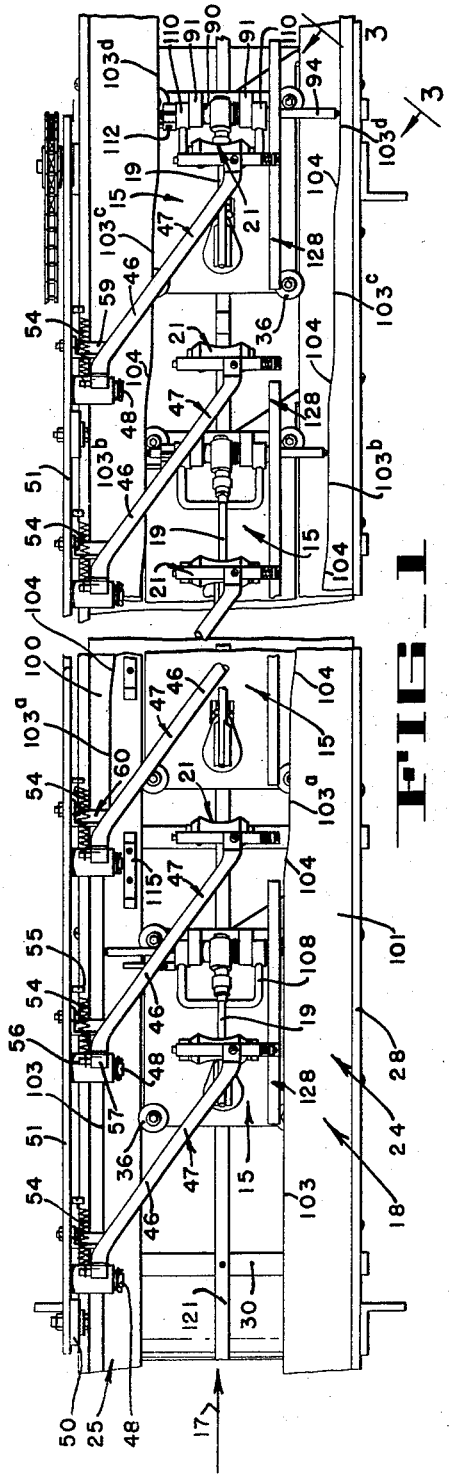
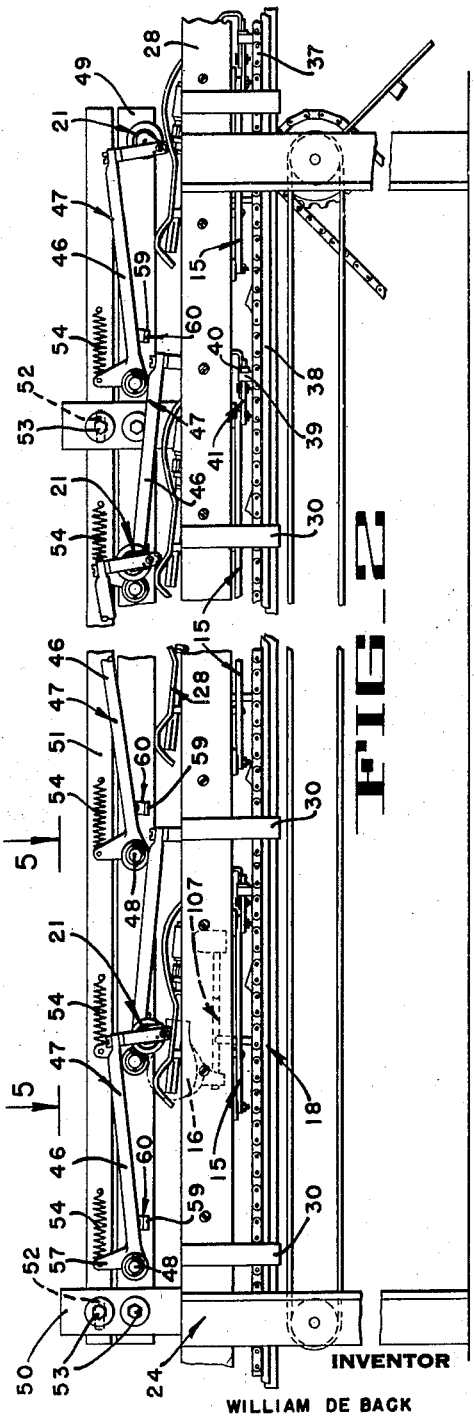
INVENTOR
WILLIAM DE BACK
BY Hans G. Hoffmeister
ATTORNEY Dec. 30, 1958  W. DE BACK  2,866,486

PEELING MACHINE HAVING PEAR INDEXING MEANS

Filed Oct. 13, 1954  5 Sheets-Sheet 2

INVENTOR
WILLIAM DE BACK
BY Hans G. Hoffmeister
ATTORNEY

Dec. 30, 1958
W. DE BACK
2,866,486
PEELING MACHINE HAVING PEAR INDEXING MEANS
Filed Oct. 13, 1954
5 Sheets-Sheet 3
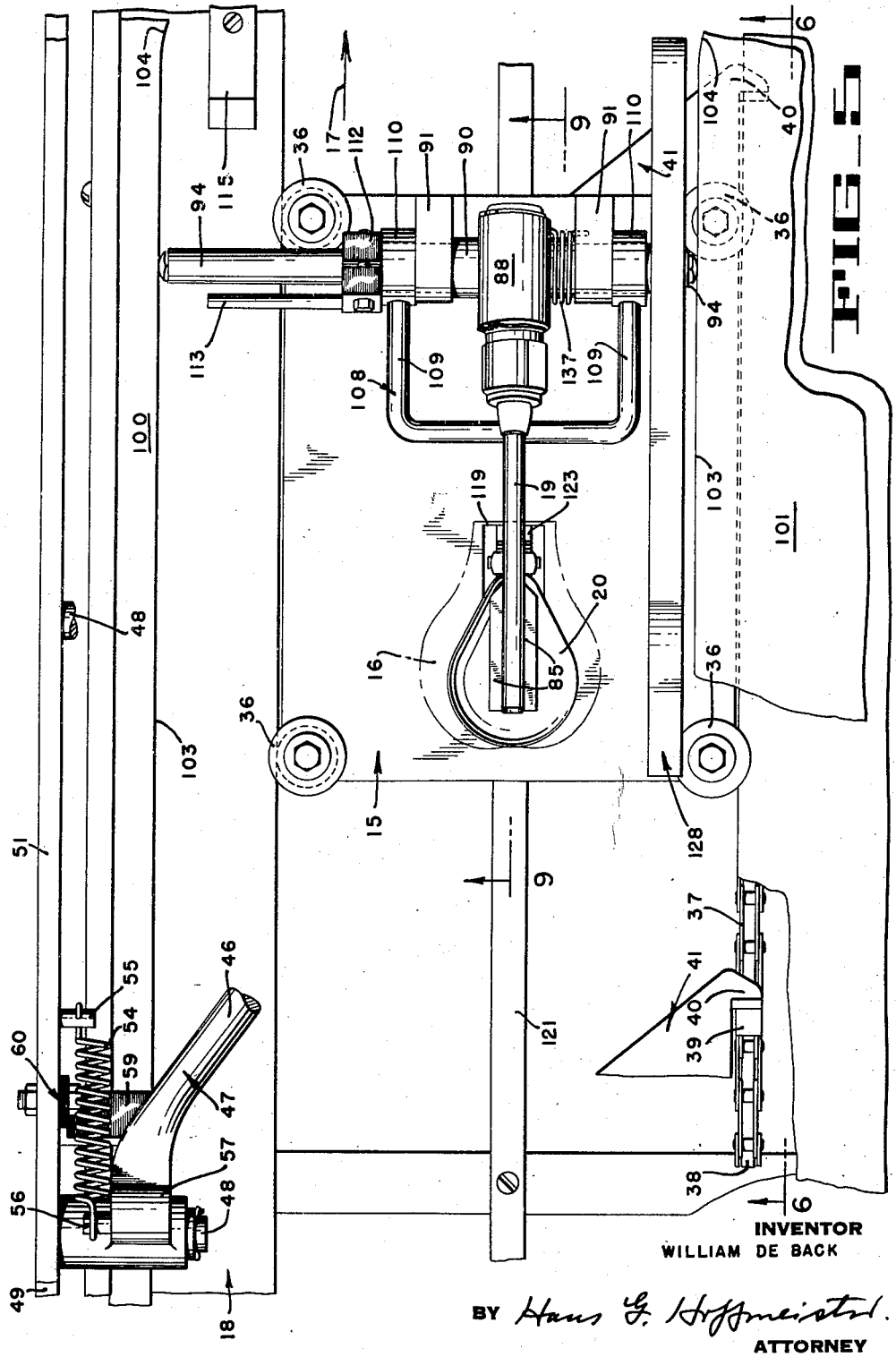
FIG_5
INVENTOR
WILLIAM DE BACK
BY *Hans G. Hoffmeister*
ATTORNEY Dec. 30, 1958 W. DE BACK 2,866,486
PEELING MACHINE HAVING PEAR INDEXING MEANS
Filed Oct. 13, 1954 5 Sheets-Sheet 4
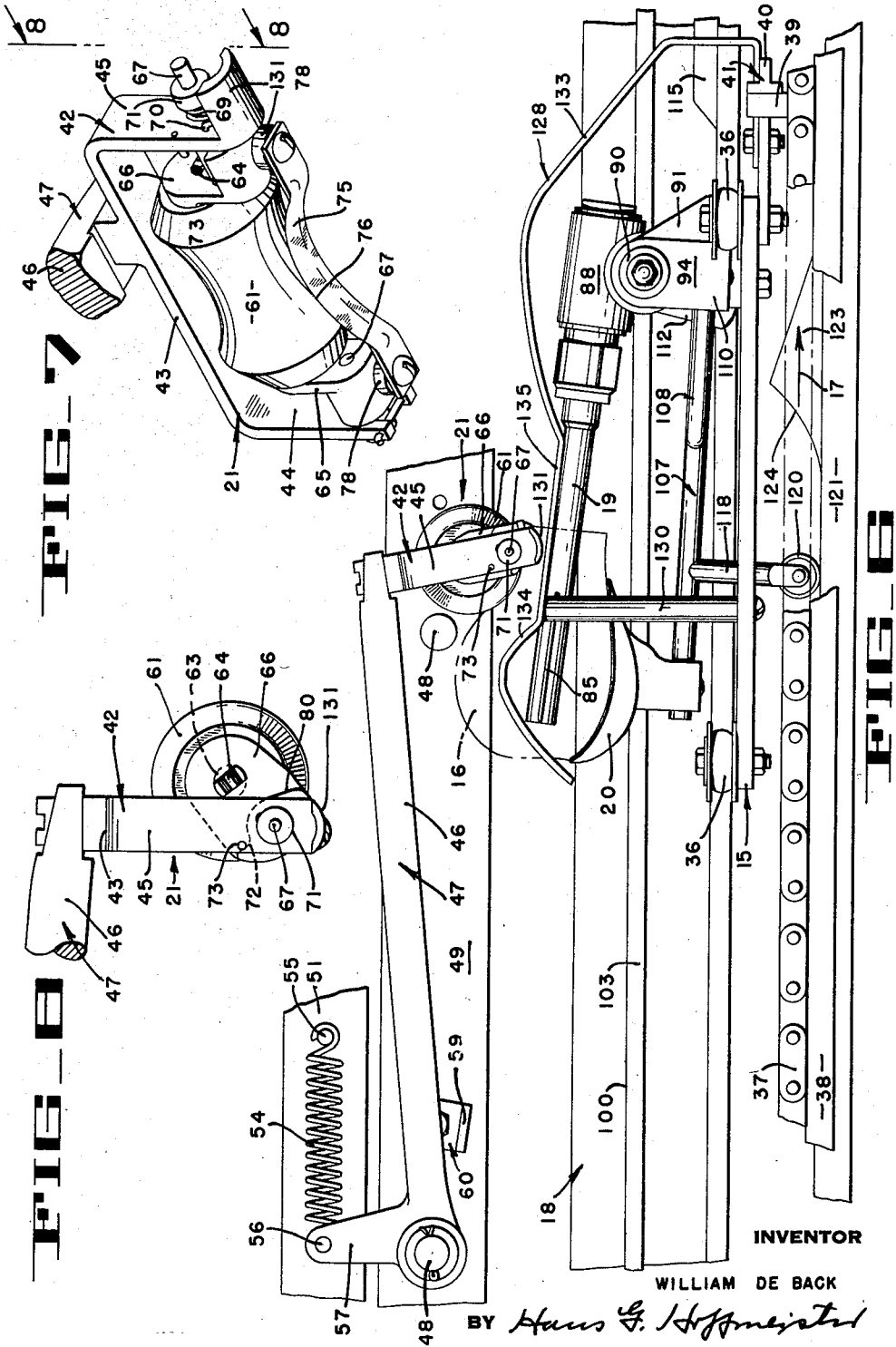
INVENTOR
WILLIAM DE BACK
BY *Hans G. Hoffmeister*
ATTORNEY Dec. 30, 1958  W. DE BACK  2,866,486
PEELING MACHINE HAVING PEAR INDEXING MEANS
Filed Oct. 13, 1954  5 Sheets-Sheet 5
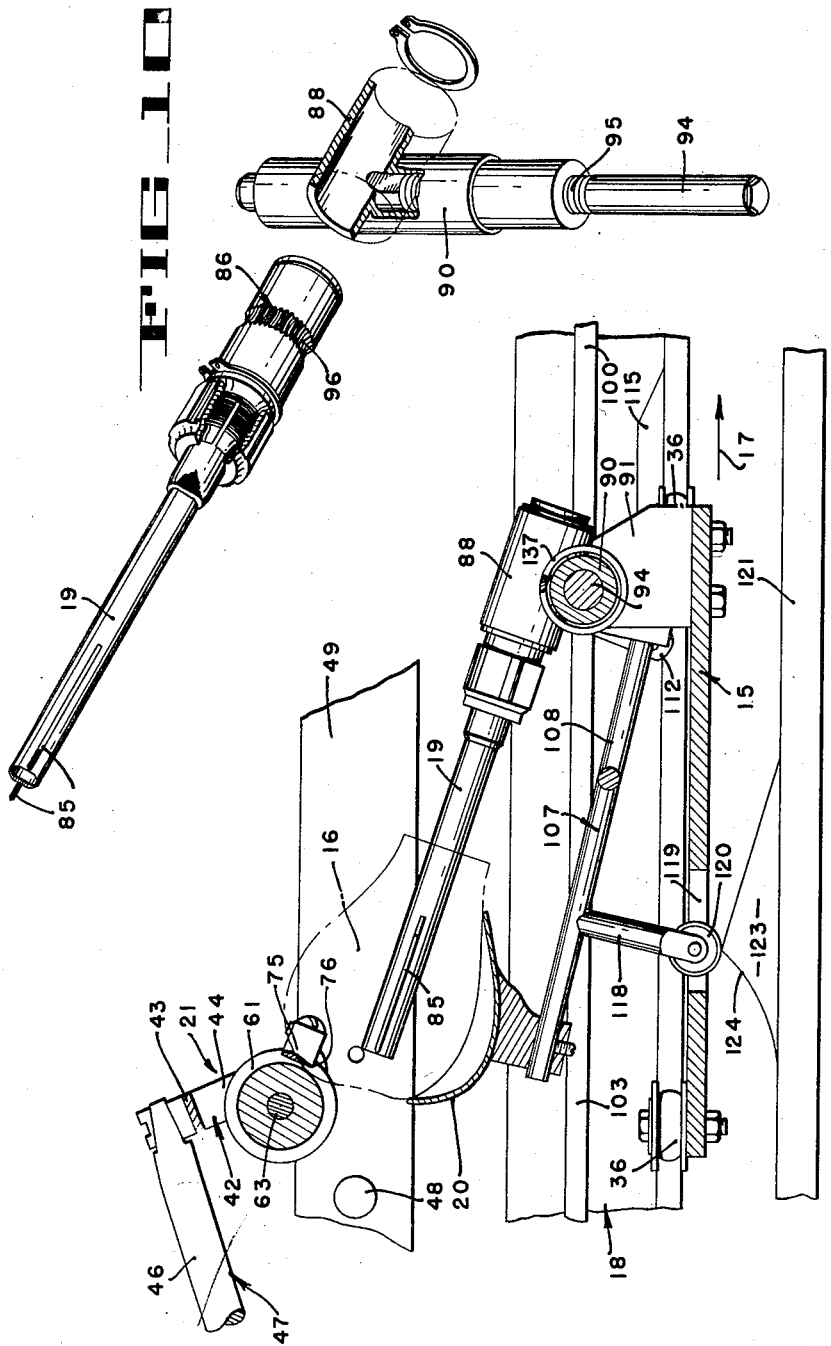
INVENTOR
WILLIAM DE BACK
BY Hans G. Hoffmeister
ATTORNEY United States Patent Office 2,866,486
Patented Dec. 30, 1958

2,866,486
PEELING MACHINE HAVING PEAR INDEXING MEANS

William de Back, St. Nicolas-Waas, Belgium, assignor to Food Machinery and Chemical Corporation, San Jose, Calif., a corporation of Delaware Application October 13, 1954, Serial No. 462,064

11 Claims. (Cl. 146—43)

This invention relates to improvements in machinery for processing fruit and more particularly pertains to an improved machine for peeling fruit, such as pears and the like.

An object of this invention is to provide a novel apparatus for peeling a piece of fruit, such as a pear, while the fruit is continuously moved along a straight-line path.

Another object is to provide novel means for intermittently angularly indexing a pear about its stem-blossom axis during a peeling operation.

Another object is to provide means for maintaining a peeling cutter in constant contact with a piece of fruit during a continuous peeling operation.

Another object is to provide improved means for positively supporting pears during a peeling operation.

Another object is to provide a pear peeling machine that is fully automatic in the performance of its several operations.

Other and further objects and advantages of the present invention will become apparent from the following description taken in connection with the accompanying drawings.

Fig. 1 is a fragmentary plan view of a pear peeling machine constructed in accordance with the teachings of the present invention.

Fig. 2 is a fragmentary side elevation of the machine of Fig. 1.

Fig. 5 is an enlarged fragmentary plan view, with parts broken away, of a portion of the present pear peeling machine, taken along lines 5—5 of Fig. 2.

Fig. 6 is a fragmentary side elevation, with parts broken away, taken along lines 6—6 of Fig. 5.

Fig. 7 is a fragmentary perspective of the cutter assembly used with the pear machine of the present invention.

Fig. 8 is a side elevation taken on lines 8—8 of Fig. 7.

Fig. 9 is a fragmentary vertical section taken along lines 9—9 of Fig. 5.

Fig. 10 is an exploded perspective, with parts broken away, of the impaling tube and the impaling tube actuating mechanism used in the present invention.

Figures 3, 4:
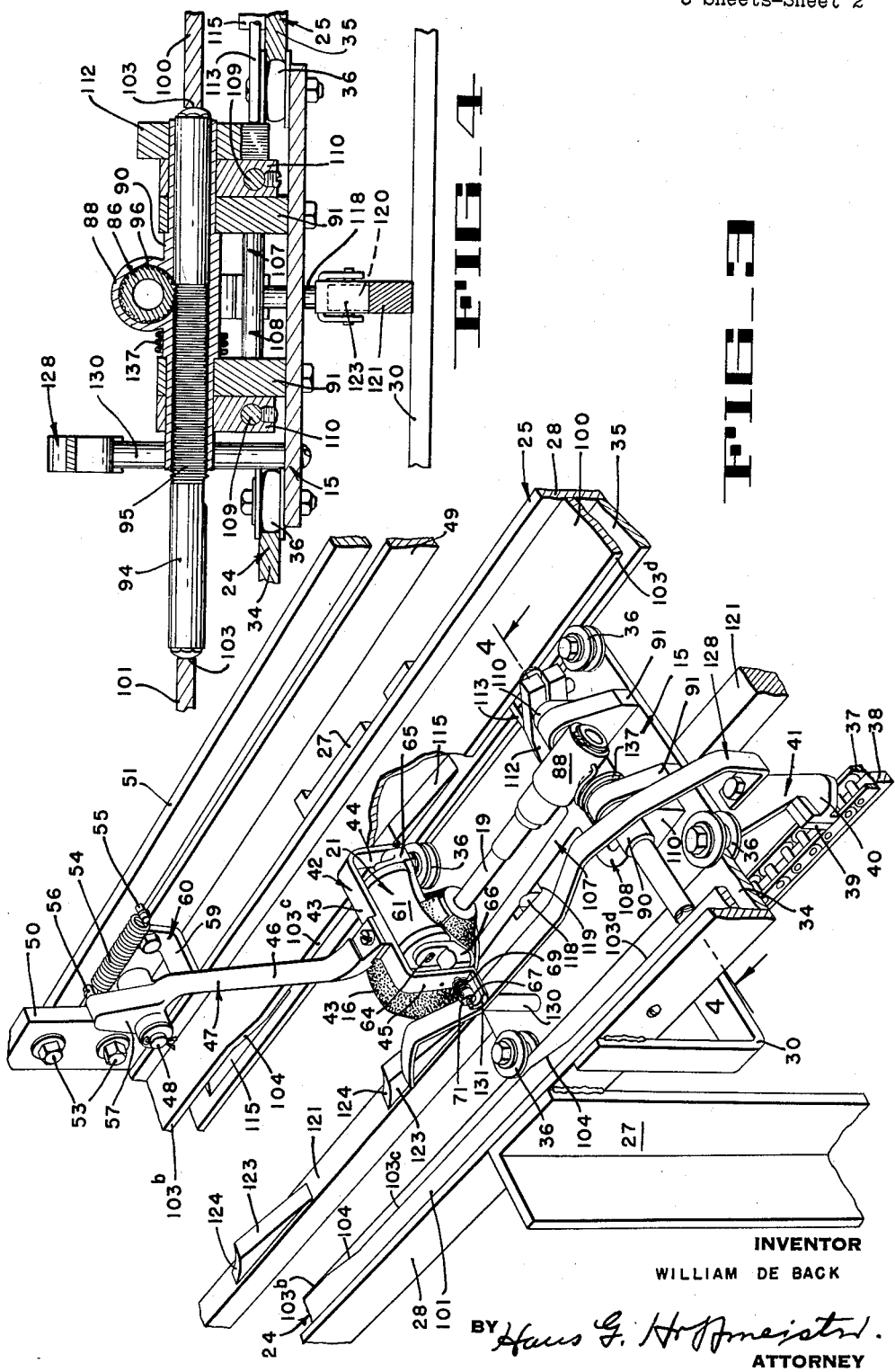
Fig. 3 is a fragmentary perspective of a portion of the machine of Fig. 1 taken along lines 3—3 of Fig. 1.
Fig. 4 is a fragmentary vertical section taken on lines 4—4 of Fig. 3.

In Figs. 2, 3 and 4 the reference numeral 15 indicates a carriage on which a fruit 16, such as a pear, is transported in the direction indicated by arrow 17 along a support structure 18 with the stem-blossom axis of the pear disposed in a substantially horizontal plane. The pear is impaled on a stemming tube 19 and is supported in a cup 20 (Fig. 2) pivotally mounted on the carriage 15. As the pear is carried along the structure 18, it passes under a plurality of consecutive cutters 21, each of which contacts the pear at its stem end and slices a longitudinal strip of peel from the surface of the pear, the strip extending from the stem end to the blossom end of the pear. In order that each cutter 21 will contact an unpeeled portion of the pear, the stemming tube is indexed angularly about its axis immediately after the pear passes each cutter. It will be understood that a sufficient number of cutters is provided so that the skin will be removed from the entire surface of each pear.

The support structure 18 comprises a pair of spaced, longitudinally extending side frame members 24 and 25 (Fig. 1), each side frame member consisting of a plurality of upright posts 27 to the upper end of which is secured a longitudinally extending, upright rigid bar 28. The side frames 24 and 25 are secured together in mutual bracing relations by transverse straps 30 (Fig. 2).

To provide tracks for the carriage 15, oppositely disposed flat bars 34 and 35 (Fig. 3) are secured, as by welding, to the inner faces of the longitudinal bars 28. Two grooved wheels 36 are rotatably mounted on each side of the carriage 15, the groove of each wheel being adapted to receive the edge of one of the tracks 34 or 35 in rolling engagement. Each carriage 15 is propelled along the support structure 18 by a continuously driven endless chain 37 which is mounted on the support structure 18 in a conventional manner and has its upper run supported in sliding relation on a flat support member 38 mounted on the frame 24 immediately below and parallel to the bar 35. The chain 37 is provided with upstanding drive lugs 39, each of which is arranged to drivingly engage an arm 40 which overlies the chain 37 and which is integrally formed on a bracket 41 fixedly secured to the forward portion of each carriage 15. In this manner, the continuously moving chain 38 may simultaneously advance a plurality of carriages 15 one after the other past the aligned cutters 21.

The spaced tracks 34 and 35, which support the carriages, may be flat throughout their length so that each carriage with an unpeeled pear thereon may be bodily placed on the tracks at one end of the machine, as at the left end of Fig. 2, and removed at the opposite end after the pear has been peeled. If desired, the tracks 34 and 35 may be formed as a closed circuit around which the carriages are continuously moved. It will be evident that, with a circuitous arrangement, the curved portions of the tracks 34 and 35 must have a curvature sufficiently large to accommodate the carriage 15.

Each cutter 21 comprises a yoke 42 (Fig. 7) which has a body portion 43 and spaced arms 44 and 45. The yoke is secured in depending relation on the outer end of one arm 46 (Fig. 6) of a bellcrank 47 pivotally mounted at 48 on an elongated support bar 49. As best seen in Fig. 2, the bar 49 extends longitudinally of the support frame 18 and is supported from the frame 18 by a plurality of spaced vertical posts 50. An upper support bar 51 is adjustably mounted longitudinally of the machine immediately above the bar 49 by means of a plurality of bolts 53, each of which extends through an opening in the vertical bar 50 and through a slot 52 in the upper support bar 51. The bellcrank 47 (Fig. 6) is urged in a clockwise pivoting direction by a tension spring 54 which is anchored at one end on a pin 55 projecting from the upper support bar 51 and is anchored at the other end on a pin 56 projecting from the outer end of the other arm 57 of the bellcrank 47. Clockwise pivoting movement of the bellcrank 47 is limited by a ledge 59 formed on an angle member 60 which projects inwardly from the support bar 49.

Each cutter includes a concave guide roller 61 (Fig. 7) that is rotatably mounted on a shaft 63 (Fig. 8) which has flattened end portions 64 secured, as by swaging, in openings in the outer ends of two spaced roller support arms 65 and 66 (Fig. 7). Each support arm carries a stub shaft 67 which is rotatably journaled in one of the two arms 44 and 45 of the yoke 42. The guide roller 61 is, therefore, freely rotatable about its own axis on the shaft 63 and is rotatable as a unit with the spaced arms 65 and 66 about the axis of shaft 67. A torsion spring 69 (Fig. 7) is anchored at one end in a hole 70 in the yoke arm 45 and at the other end in a collar 71 adjustably secured to one of the aligned stub shafts 67. The torsion spring 69 tends to rotate the shaft 67 in a clockwise direction (Fig. 8) and to thereby pivot the guide roller 61 and the two arms 65 and 66 as a unit toward the position shown in Fig. 8, which is the position the roller assumes before each cutting stroke of the knife and is defined by the abutment of a shoulder 72 formed on the arm 66 with a pin 73 projecting from the yoke arm 45. A peeling knife 75 (Fig. 7), having a cutting edge 76, extends transversely of the yoke 42 and is secured at each end to bosses 78 formed on the arms 65 and 66. The intermediate portion of the knife is arcuate in shape so as to conform to the contour of the concave guide roller 61. The guide roller 61 gauges the depth of the cut taken by the knife 75 and steers or turns the knife to follow closely the irregular contour of the fruit. As the roller 61 traverses the surface of the pear, the knife is pivoted from the position of Fig. 8 in a counterclockwise direction against the resistance of the torsion spring 69 until a shoulder 80 (Fig. 8) formed on the arm 66 abuts the stop pin 73.

As previously mentioned, during the peeling operation the pear is impaled on a stemming tube 19 which is provided with fins 85 (Fig. 10) on one end and is secured at the other end to a pinion 86 which is rotatably journaled in a cylindrical housing 88 integrally formed transversely on a sleeve 90. The sleeve 90 is rotatably journaled in spaced bearing blocks 91 (Fig. 4) which are rigidly secured to the upper surface of the carriage 15. Journaled within the sleeve 90 and arranged to slide axially therein is a rod 94 having a circular rack 95 formed thereon, the teeth of the rack being arranged to mesh with concave teeth 96 of the pinion 86. It will be evident that, as the rod 94 is shifted from left to right, or vice versa, the pinion 86 and the attached stemming tube will be angularly indexed, about the axis of the pinion, a number of degrees proportional to the amount of lateral shifting of the rod 94. The lateral disposition of the rod 94 is controlled by two longitudinally extending, horizontally disposed cam plates 100 and 101 (Fig. 1) which have camming edges against which the opposite ends of the rod 94 abut. Each cam plate has a plurality of straight camming edge portions 103, 103a, 103b, 103c and 103d connected by slanted transition portions 104. The edge portions 103, 103a, 103b, 103c and 103d on one cam plate are of the same longitudinal extent and are directly opposite corresponding edge portions 103, 103a, 103b, 103c and 103d on the other cam plate and cooperate therewith to determine the lateral position of the rod 94. As seen in Fig. 1, at the left-hand end of the machine the edges 103, 103 hold the rod 94 in a limiting position at one side of the machine. As the carriage 15 travels toward the right, the rod 94 will be shifted step by step transversely of the frame until the camming edges 103d, 103d are reached. At this point the rod 94 has reached the limiting position at the opposite side of the machine and the intermittent angular indexing movements of the stemming tube and the pear thereon will be completed. It will be understood that the number of angular indexing movements of the stemming tube are so coordinated with the width of each strip of peel severed by the rotary cutter that the entire surface of the pear is peeled while the pear is rotated one complete revolution.

When a strip of peel is being cut from the pear, the pear is supported jointly by the stemming tube 19 and by the support cup 20 (Fig. 6) which is adjustably secured to one end of a rod 107. At its other end the rod 107 is welded to a yoke 108 (Fig. 5) whose arms 109 are secured to spaced bearing blocks 110 (Fig. 4) rotatably mounted on the sleeve 90. When a pear is to be indexed angularly to a new position preparatory to a strip being peeled therefrom, it is desirable to support the pear from the stemming tube alone since the frictional engagement of the cup 20 with the pear hinders the indexing movement. In order to raise the stemming tube to lift the pear out of the cup 20 during indexing of the pear, a lever 112 (Figs. 3 and 4) is keyed to the sleeve 90 adjacent one end thereof. The lever 112 carries a follower pin 113 which is arranged to ride up and down the camming surfaces of cams 115 (Fig. 3) that are mounted in spaced relation along the upper surface of the bar 35. The cams 115 are so located that the stemming tube will be pivoted upwardly just before each rod 94 contacts one of the transition portions 104 of the cam plates 100 and 101 to effect rotation of the stemming tube. Further, the cams 115 are so designed that the stemming tube will remain elevated until the angular indexing of the tube is finished.

By comparing Figs. 6 and 9, it will be noted that the contour of the stem end of the pear is such that the guide roller can readily accommodate itself to the change in shape of the pear during the initial part of the cutting of each strip of peel, as seen in Fig. 6. However, when the butt end of the pear is reached by the cutter, the cutter has less time to accommodate itself to the steeply inclined butt end surface. To maintain the knife in contact with the butt end of the pear and to improve the cutting angle, the cup 20 is elevated as the cutter approaches the butt end of the pear. The elevation of the cup 20 is controlled by a rod 118 (Fig. 9) which projects downwardly from the cup support rod 107, through an opening 119 in the carriage 15, and carries at its lower end a cam follower wheel 120. The wheel 120 is rotatably mounted on the rod 118 and normally rides along the flat upper surface of a cam strap 121 which is mounted on the transverse frame straps 30 and is disposed centrally between the frame members 24 and 25, as seen in Fig. 5. To elevate the cup 20, each strap 121 is provided with spaced cams 123 (Fig. 9), each of which has an upwardly inclined camming surface 124 upon which the roller rides to lift the cup support rod 107 to the elevated position of Fig. 9.

At the beginning of each cutting stroke, it is necessary that the cutter 21 be disposed in a position in which the guide roller 61 may readily engage the stem end of the pear. For this purpose the carriage 15 is provided with a track 128 (Figs. 3 and 6) in the form of a curved strap of metal extending longitudinally of the carriage. At its forward end, the track 128 is secured to the bracket 41 (Fig. 3) on the carriage 15 and, near its rear end, the track is secured to the top of a support post 130 which is mounted on the carriage. The track 128 is arranged to be contacted by a curved follower shoe 131 (Figs. 6 and 7) formed on the end of the leg 45 of the yoke 42. It will be noted in Fig. 6 that the track 128 is provided with a portion 133 which lifts the cutter clear of the stemming tube housing and a portion 134 which will lift the cutter clear of the free end of the stemming tube if no pear is impaled thereon. An intermediate guide portion 135 positions the cutter so that the guide roller 61 is in position to ride up the stem end of a pear impaled on the stemming tube. It will be understood that, before the pear is impaled on the stemming tube, a portion of the stem end of the pear is cut off so that the remaining portion has a predetermined diameter.

In operation, the machine of the present invention is put into operation by starting the power unit (not shown) that drives the endless chain 37. Each upstanding lug 39 on the chain 37 will drivingly engage the arm 40 of the carriage bracket 41 to propel the carriage 15 forwardly in the direction of arrow 17 along the support structure 18. The operator is stationed at a loading point which may be located at the left-hand end of the machine of Figs. 1 and 2. As each carriage 15 passes, the operator impales a pear on the stemming tube 19 and the pear is then carried toward the right under the consecutive cutters 21.

As each pear approaches a cutter 21, the follower shoe 131 (Fig. 6) of the cutter contacts the guide track 128 so that the cutter is first raised over the stemming tube housing 88 and then, when the shoe 131 rides along the guide surface 135, the cutter 21 is positioned in a predetermined desirable position relative to the stem end of the pear. In this position the guide roller 61 and the cutting blade 75 can advantageously engage the pear and begin to slice a longitudinal strip of peel therefrom.

As the cutter 21 traverses the pear from the stem end to the blossom end, the spring 54 exerts a continuous pull on the bellcrank 47 to maintain the roller 61 in contact with the pear. As the roller 61 approaches the butt end of the pear, the cup 20 is raised upwardly, due to the contact of the roller 120 (Fig. 9) with the cam surface 124, causing the butt end of the pear to be elevated and presented to the cutting blade 75 of the cutter at a desirable angle. A torsion spring 137 (Fig. 3), which is operatively connected between one of the bearing blocks 91 and the housing 88 of the stemming tube, positively lowers the pear after the butt end is peeled.

Immediately after the pear passes out from underneath the cutter 21, the sliding rod 94 (Fig. 4) contacts a transition portion 104—104 of the cooperating cams 100—101. When the rod 94 is shifted laterally, the stemming tube 19 is rotated a predetermined number of degrees through the rack 95 and pinion 86 so that an unpeeled portion of the surface of the pear will be presented to the cutter 21 that is next ahead.

Just before the stemming tube is indexed, it is pivoted upwardly by the engagement of the arm 113 with the cam 115 (Fig. 3), thus lifting the pear out of frictional engagement with the cup 20 during the rotary movement of the pear. After the stemming tube is indexed, the torsion spring 137 pivots the tube downwardly to reseat the pear in the cup.

From the foregoing description it will be seen that this invention provides a novel means for peeling a fruit while it is continuously moved along a straight line path. The use of cam-controlled means for indexing the stemming tube permits the use of the simple straight line movement which has heretofore been considered impractical for a fruit peeling operation. Also, the use of means for raising the pear as the cutter approaches the butt end of the pear assures the efficient, uniform peeling of the pear from the stem end to the butt end.

While the machine of the present invention is particularly adapted for use in peeling pears, it will be recognized that many other types of fruit could be efficiently peeled in this machine. It is evident that the means of guiding the cutter into contact with the fruit and the means of lifting or lowering the fruit during the cutting operation would have to be modified to adapt the machine to fruits having contours different than the contour of a pear.

It will be understood that modifications and variations of the embodiment of the invention disclosed herein may be resorted to without departing from the scope of the novel concepts of the invention.

Having thus described my invention, what I claim as new and desire to protect by Letters Patent is:

1. A machine for peeling pears or the like comprising a carriage movable along a predetermined path, a tubular member mounted on said carriage transversely of said path, a pear support member rotatably mounted on said tubular member, a rod supported in said tubular member for movement along the axis of said tubular member, and means operatively connected between said rod and said support member for changing axial movement of said rod to rotary movement of said support member.

2. A machine for peeling pears or the like comprising a carriage mounted for movement along a predetermined path, a pear support member rotatably mounted on said carriage, a rod slidably journaled on said carriage, means connected between said rod and said support member for converting sliding movement of said rod to rotary movement of said support member, and a cam disposed alongside the path of movement of said rod and having a camming surface adapted to contact said rod as said carriage moves along said path and shift said rod laterally in fixed increments.

3. A machine for peeling pears or the like comprising a carriage movable along a predetermined path, a tubular member mounted on said carriage transversely of said path, a pear support member rotatably mounted on said tubular member, a rod slidably supported in said tubular member for movement transversely of said carriage, means connected between said rod and said support member for changing sliding movement of said rod to rotary movement of said support member, and cam means disposed at equal intervals along the path of movement of said carriage and arranged to be contacted by said rod for shifting said rod laterally in predetermined amounts whereby to rotate said pear support member in angular increments less than a full rotation.

4. A machine for peeling pears or the like comprising a carriage movable along a straight line path, a tubular member mounted on said carriage transversely of said path, a pear support member rotatably mounted on said tubular member and movable with said tubular member during pivoting thereof, a rod slidably supported in said tubular member for movement transversely of said carriage, means operatively connected between said rod and said support member for changing sliding movement of said rod to rotary movement of said support member, and means operatively connected between said carriage and said rod and responsive to a predetermined movement of said carriage for shifting said rod laterally to rotate said pear support member.

5. A machine for peeling pears or the like comprising a carriage movable along a predetermined path, a fruit support member pivotally mounted on said carriage and adapted to receive and hold a pear with the stem-blossom axis of the pear substantially parallel to said path, a plurality of aligned cutters disposed above said carriage as said carriage moves over a portion of said path and arranged to extend into the path of movement of the pear to engage the pear and slice a portion of peel therefrom, a cup pivotally mounted on said carriage below said fruit support member and adapted to receive said pear in supporting relation, and lifting means operatively connected between said cup and said carriage for raising said cup as each cutter traverses the blossom end of the pear.

6. A machine for peeling pears or the like comprising a carriage mounted for movement along a predetermined path, an impaling rod mounted on said carriage for rotation about its axis and for upward pivoting relative to said carriage and adapted to support a pear for rotation about the longitudinal axis of the pear, a fruit support member disposed between said carriage and said rod and arranged to partially support the pear held by said rotatable rod, means operatively associated with said rotatable rod for actuating said rod to rotate the pear, and means operably associated with said impaling rod for pivoting said rod upwardly and lifting the pear away from said support member and holding it out of contact with said member during rotation of the pear.

7. A machine for peeling pears or the like comprising a carriage movable along a straight line path, pear support means pivotally mounted on said carriage and arranged to hold a pear with its stem-blossom axis substantially parallel to said path, a cutter support member adjustably mounted adjacent said carriage, guide means on said cutter support member extending into the path of movement of the pear and arranged to press against said pear to follow the contour thereof as said carriage carries the pear along said path, a blade carried by said cutter support member in fixed relation to said guide means and arranged to slice a strip of peel from said pear as said guide means moves along the surface of the pear, a pressure applying member disposed on the opposite side of the pear support means from said blade and mounted for movement toward said support means to engage the pear thereon and effect pivoting movement of said support means toward said blade, and cam means operatively associated with said pressure applying member and arranged to move said member toward said support means to urge the pear toward said guide means as said guide means traverses the blossom end of the pear.

8. A machine for peeling pears or the like comprising a support structure, a carriage movable on said structure along a straight line path, a cutter support member pivotally mounted above said path, a pear impaling member mounted on said carriage for movement upwardly toward said cutter support member, a guide roller rotatably mounted on said cutter support member and extending into the path of movement of a pear on said impaling member, a cutting blade mounted on said support member in spaced relation to said guide roller, means for urging said support member toward a pear on said impaling member to move said guide roller and said blade into engagement with the pear, and a pressure applying member movably mounted on said carriage below said impaling member and arranged to engage and lift the pear toward said blade upon being actuated, and a cam on said support structure arranged to actuate said pressure applying member during the engagement of said roller and blade with the blossom end of the pear.

9. A machine for peeling pears or the like comprising a support structure, a carriage movable on said support structure along a predetermined straight line path, a first pear support member pivotally mounted on said carriage and adapted to hold a pear with its stem-blossom axis substantially parallel to the path of movement of said carriage, a lever pivotally mounted above the path of movement of the carriage, a guide roller rotatably mounted on said lever, a cutting blade mounted on said lever in spaced relation to said guide roller and directly above said first pear support member, spring means arranged to pivot said lever in a direction to urge said guide roller into contact with a pear on said first support member and to cause said roller to traverse the pear from the stem end to the blossom end as said carriage moves underneath said guide roller, a second pear support member disposed below and in supporting contact with the pear on said first support member, a cam on said support structure, and means operatively connected between said second pear support member and said cam for pivoting said support member upwardly as said guide roller traverses the blossom end of the pear.

10. A machine for peeling pears or the like comprising a carriage movable along a predetermined path, a rotatable impaling member pivotally mounted on said carriage, a cup pivotally mounted on said carriage below said impaling member and adapted to support a pear disposed on said impaling member, a cutter mounted above the path of movement of the pear and arranged to engage the surface of the pear to remove a portion of the peel, means coordinated with the movement of said carriage for periodically rotating said impaling member a portion of a full revolution, first cam means adjacent the path of said carriage and arranged to contact and pivot said impaling member during said rotary movement to lift the pear clear of said cup, and second cam means operatively associated with said cup for pivoting said cup upwardly during the engagement of said cutter with the blossom end of the pear disposed in said cup.

11. In a machine for peeling pears, a stationary support structure, a first and a second cam mounted in predetermined spaced position on said support structure, a carriage mounted for movement along said structure, means for moving said carriage, an impaling tube mounted on said carriage for rotation about its axis and for pivotal movement in a vertical direction between a lowered and an elevated position, a first cam follower connected to said tube and disposed on said carriage in position to engage said first cam to swing said tube in a vertical direction as said carriage moves along said structure, and a second cam follower mounted on said carriage in position to be connected and actuated by said second cam and operatively associated with said tube to rotate said tube through a fixed angle upon being actuated by said second cam, the spacing of said first and second cams relative to said support structure being coordinated with the positions of said cam followers on said carriage so as to cause said impaling tube to be raised to the elevated position while said tube is rotated through said fixed angle.

References Cited in the file of this patent

UNITED STATES PATENTS

| | | |
|---|---|---|
| 606,035 | Stewart | June 21, 1898 |
| 1,201,417 | Zimmerman | Oct. 17, 1916 |
| 1,277,000 | Turner | Aug. 27, 1918 |
| 1,502,990 | Kiefer | July 29, 1924 |
| 1,837,335 | Reinstein et al. | Dec. 22, 1931 |
| 1,973,996 | Reinstein | Sept. 18, 1934 |
| 2,568,947 | Carroll | Sept. 25, 1951 |
| 2,663,341 | Grove | Dec. 22, 1953 |
| 2,673,583 | Skog | Mar. 30, 1954 |
| 2,699,191 | De Back et al. | Jan. 11, 1955 |

FOREIGN PATENTS

| | | |
|---|---|---|
| 701,862 | France | Jan. 13, 1931 |